(12) United States Patent
Kobayashi et al.

(10) Patent No.: US 7,729,341 B2
(45) Date of Patent: Jun. 1, 2010

(54) IP TELEPHONE APPARATUS AND SYSTEM HAVING AUTOMATIC REGISTRATION

(75) Inventors: Kazuto Kobayashi, Kanagawa (JP); Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1261 days.

(21) Appl. No.: 11/195,817

(22) Filed: Aug. 3, 2005

(65) Prior Publication Data
US 2006/0067305 A1  Mar. 30, 2006

(30) Foreign Application Priority Data
Aug. 26, 2004  (JP)  ............... P2004-247129
Mar. 23, 2005  (JP)  ............... P2005-084357

(51) Int. Cl.
*H04L 12/28*  (2006.01)

(52) U.S. Cl. .............. 370/352; 370/351; 379/88.11; 379/88.12; 379/88.19; 348/14.01

(58) Field of Classification Search ........... 370/351, 370/352; 379/88.12, 88.11, 88.19; 348/14.01
See application file for complete search history.

(56) References Cited

U.S. PATENT DOCUMENTS

| 6,154,738 | A  | * | 11/2000 | Call .............................. 707/4 |
| 6,539,077 | B1 | * | 3/2003  | Ranalli et al. .............. 379/67.1 |
| 2002/0035594 | A1 | * | 3/2002  | Dreke et al. ................. 709/203 |
| 2003/0018704 | A1 | * | 1/2003  | Polychronidis et al. ..... 709/202 |
| 2003/0086402 | A1 |   | 5/2003  | Yang |
| 2003/0210770 | A1 | * | 11/2003 | Krejcarek ................. 379/88.17 |
| 2004/0264653 | A1 | * | 12/2004 | Revisky et al. ........... 379/88.12 |
| 2005/0073574 | A1 | * | 4/2005  | Krisbergh et al. ........ 348/14.01 |
| 2005/0135240 | A1 | * | 6/2005  | Ozugur ....................... 370/229 |

FOREIGN PATENT DOCUMENTS

| EP | 1309211 A |   | 5/2003 |
| KR | 10-2001 0109566 |   | 12/2001 |
| WO | WO 03107627 A1 | * | 12/2003 |

OTHER PUBLICATIONS

Myeong-Heum Park, English language machine translation of Korean Patent Application "System and method for providing a internet publicphone service," Dec. 12, 2001.*

(Continued)

*Primary Examiner*—Dang T Ton
*Assistant Examiner*—Robert M Morlan
(74) *Attorney, Agent, or Firm*—Greenblum & Bernstein, P.L.C.

(57) ABSTRACT

A CPU of an IP telephone apparatus transmits, to an ENUM server, a message "Request the NAPTR record" corresponding to the destination terminal. The CPU also receives a message "Respond to the NAPTR information" in response to the message "Respond to the NAPTR record". Further, the CPU automatically transmits, from a network I/F to the ENUM server, the request for the registration of information regarding the apparatus terminal when the switch is initially turned ON after the IP telephone apparatus is installed and connected to the IP network. The request for the registration is previously stored in a memory. The CPU also receives the message "Respond indicating completion of the registration" in response to the request for the registration.

9 Claims, 11 Drawing Sheets

OTHER PUBLICATIONS

ChipX86, Gaim's MSN and Buddy Pounce Improvements, Jun. 15, 2004.*
Bejerasco, Christine. "WORM_AGOBOT.GY—Technical Details" Trend Micro, Mar. 22, 2004.*
A.B. Roach. Session initiation protocol (SIP)-specific event notification, IETF RFC 3265, 2002.*
A. Niemi, (Ed.), Session Initiation Protocol (SIP) Extension for Event State Publication, IETF RFC 3903, 2004.*
A publication issued by ENUM Trial Japan "ENUM Trial Japan First Report", May, 2004, together with a partial English translation of the same.
U.S. Appl. No. 11/082,795 to Kaizawa et al., filed Mar. 18, 2005.
U.S. Appl. No. 11/082,796 to Kaizawa et al., filed Mar. 18, 2005.
U.S. Appl. No. 11/150,111 to Kobayashi et al., filed Jun. 13, 2005.
U.S. Appl. No. 11/150,117 to Kobayashi et al., filed Jun. 13, 2005.
U.S. Appl. No. 11/150,119 to Kobayashi et al., filed Jun. 13, 2005.
U.S. Appl. No. 11/166,236 to Kobayashi et al., filed Jun. 27, 2005.
U.S. Appl. No. 11/183,955 to Kobayashi et al., filed Jul. 19, 2005.
U.S. Appl. No. 11/183,963 to Kobayashi et al., filed Jul. 19, 2005.
U.S. Appl. No. 11/183,988 to Kobayashi et al., filed Jul. 19, 2005.
U.S. Appl. No. 11/184,899 to Kobayashi et al., filed Jul. 20, 2005.
English language Abstract of KR 10-2001-0109566.
ETSI: "ENUM Administration in Europe" ETSI Standards, European Telecommunications Standards Institute, Sophia-Antipo, FR, Jul. 2002, pp. 1-45, XP002311971.
T-Systems Nova GMBH: "ENUM FollowMe WhitePaper" Internet Citation, [Online] Nov. 7, 2003, XP002353185, Retrieved from the Internet: URL:http://www.enum-trial-de/docs/ENUM-Trial_Projekt_FollowMe_v1_0.pdf [retrieved on Nov. 3, 2005] along with a partial English language translation.
Anonym: "Report of the Department of State ITAC-T Advisory Committee Study Group A Ad Hoc on ENUM" Internet Citation, [Online] Jun. 6, 2001, XP002238095, Retrieved from the Internet: URL:www.enum-forum.org/documents/2001_07_06_ENUM_Report_Department_of State_final.doc [retrieved on Apr. 11, 2003].
ETJP First Report: One-Number Reception Demo, together with an English language translation of referenced portion.; May 12, 2004.
ETJP First Report ENUM Demo, together with an English language translation of referenced portion; May 12, 2004.
Yoshirou Yoneya, "Nikkei Byte Saishin Network Gijyutu Taikei", Feb. 22, 2004, No. 47, pp. 116-120, together with an English language translation of referenced portion.

* cited by examiner

Fig.11

ENUM Database

| ENUM Domain Name | | Order | Preference | Flags | Service | URI Scheme |
|---|---|---|---|---|---|---|
| 0.0.0.0.0.0.0.1.3.1.8.e164.arpa | IN NAPTR | 100 | 10 | "u" | "E2U+sip" | "!^.*$!sip:81310000000.tokyo.sip.jp!" |
| | IN NAPTR | 100 | 10 | "u" | "E2U+massage:mailto" | "!^.*$! mailto:81310000000@tokyo.mail.com!" |
| | IN NAPTR | 100 | 10 | "u" | "E2U+http" | "!^.*$! http://www.tokyosip.com/user81310000000.html!" |
| 1.0.0.0.0.0.0.1.3.1.8.e164.arpa | IN NAPTR | 100 | 10 | "u" | "E2U+sip" | "!^.*$!sip:81310000001.tokyo.sip.jp!" |
| | IN NAPTR | 100 | 10 | "u" | "E2U+massage:mailto" | "!^.*$! mailto:81310000001@tokyo.mail.com!" |
| | IN NAPTR | 100 | 10 | "u" | "E2U+http" | "!^.*$! http://www.tokyosip.com/user81310000001.html!" |

NAPTR resource record

IP TELEPHONE APPARATUS AND SYSTEM HAVING AUTOMATIC REGISTRATION

BACKGROUND OF THE INVENTION

1. Field of the Invention

The present invention relates to an IP telephone apparatus, an ENUM server and an IP telephone system. The IP telephone system includes an IP telephone apparatus that stores a NAPTR resource record in the ENUM server.

2. Description of Related Art

Recently the Internet has been rapidly popularized. An IP telephone system has become the center of attention since a long distance communication can be performed at lower cost by using IP telephone apparatuses and since the IP telephone system enables users who have applied for the IP telephone system to communicate with each other through IP telephone apparatuses for free of charge. Additionally, an "ENUM (Telephone Number Mapping)" protocol is acknowledged as a protocol that associates the services using the Internet with the telephone numbers or associates the resources on the Internet with the telephone numbers. This ENUM protocol is specified in RFC2916 (Publication 1), which is being studied at the IETF (Internet Engineering Task Force) and the ITU-T (International Telecommunication Union-Telecommunication Standardization Sector).

The "ENUM" protocol has a function that converts a telephone number into a number corresponding to the E.164 system specified by the ITU-T and searches one of an IP address and a URI (Uniform Resource Identifier) using the mechanism of the DNS (Domain Name System) based on the converted telephone number.

An ENUM system is also being studied so that a service is provided using the "ENUM" protocol. In this ENUM system, an end user of the IP terminal apparatus such as, for example, an IP telephone apparatus which uses the ENUM system can select various functions (URI, the services using the URI {including telephone communication, e-mail and access to the database}). The end user, thus, needs to set the selected function into an "NAPTR (the Naming Authority Pointer)" resource record and to store the set NAPTR resource record in the ENUM system.

[Publication 1] "ENUM Trial Japan First Report" ENUM Trial Japan, May 2004

However, the end user of the conventional IP terminal apparatus such as an IP telephone apparatus using the "ENUM" protocol was required to set the selected function into the "NAPTR" resource record and to store the set NAPTR resource record in the ENUM system. It was problematic in that the storing operation became complex for the end users since the end users themselves had to store the NAPTR resource record.

SUMMARY OF THE INVENTION

The present invention is provided to address the above-described problem. The objective of the present invention is to provide an IP telephone apparatus, an ENUM server and an IP telephone system that automatically perform the registration process of the NAPTR record when the IP telephone apparatus is connected or by a predetermined operation. The process of the registration is performed from the IP telephone apparatus to the ENUM server. The NAPTR record information of the IP telephone apparatus is previously stored in the IP telephone apparatus.

The present invention relates to an IP telephone apparatus that is connected to an ENUM server via an IP network. The IP telephone apparatus includes a transmitter that transmits, to the ENUM server, a request for the registration of information regarding the apparatus terminal when the IP telephone apparatus is installed and connected to an IP network or when the predetermined key is selected.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 11 illustrates a drawing describing an example of the NAPTR record according to the first embodiment of the present invention.

DETAILED DESCRIPTION OF PREFERRED EMBODIMENTS

The embodiments of the present invention are explained in the following, in reference to the above-described drawings.

First Embodiment

Figure 1:
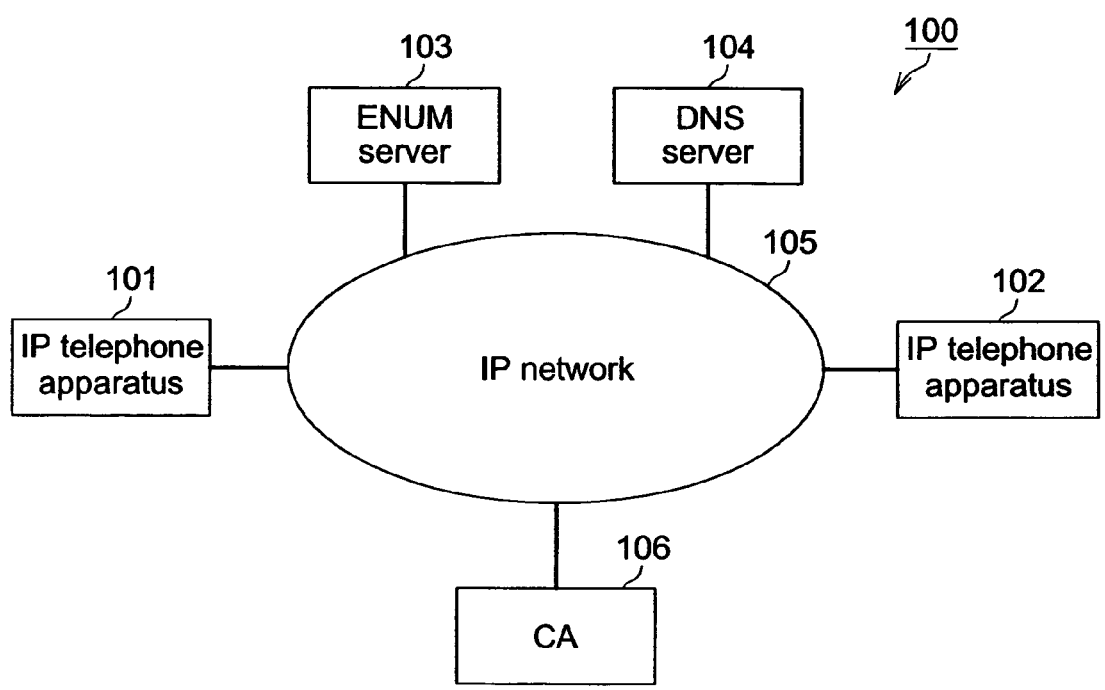
FIG. 1 illustrates a network configuration to which the IP telephone system according to the first embodiment of the present invention applies.

FIG. 1 is a diagram illustrating a network configuration of the IP telephone system according to the first embodiment of the present invention. In FIG. 1, in IP telephone system 100, IP telephone apparatus 101, IP telephone apparatus 102, ENUM server 103, DNS server 104, and call agent apparatus 106 (hereafter referred to as a CA) are mutually connected via IP network 105. Also, an IP telephone system is not limited to the configuration described in FIG. 1 and can be configured to connect to three or more telephones.

IP telephone apparatus 101 (102) and another IP telephone apparatus have functions that enable the voice communication via IP network 105.

ENUM (Telephone Number Mapping) server 103 has a database that stores a NAPTR (The Naming Authority Pointer) resource record (hereafter referred to as a NAPTR record). ENUM server 103 returns, to IP telephone apparatus 101 (102), the NAPTR record stored in the database, in response to the request of IP telephone apparatus 101 (102).

DNS (Domain Name System) server 104 includes a database that stores a URI (Uniform Resource Identifier) specified by a NAPTR record and stores an IP address corresponding to the URI. DNS server 104 returns, to IP telephone apparatus 101 (102), the IP address stored in the database, in response to the request of IP telephone apparatus 101 (102).

CA 106 controls a call connection between IP telephone apparatus 101 and IP telephone apparatus 102 via IP network 105. CA 106 receives, from IP telephone apparatus 101 (102), which is a source telephone apparatus, a request for a call connection and performs the call connection between IP telephone apparatus 102 (101), which is a destination telephone apparatus, in response to the received request.

Figure 2:
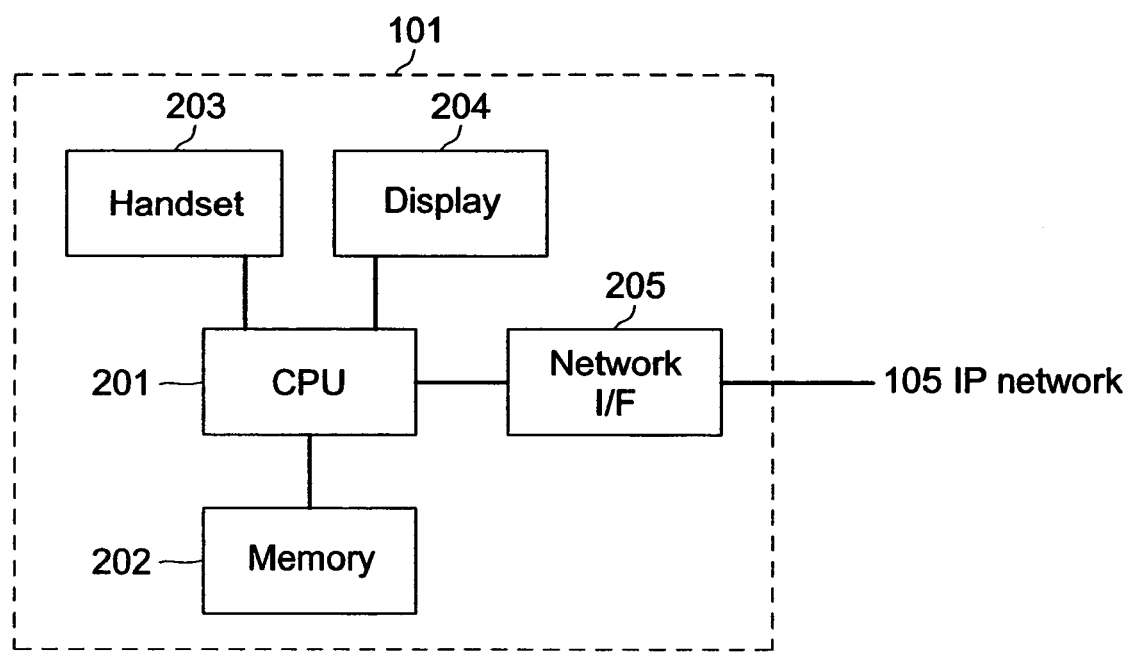
FIG. 2 illustrates a block diagram describing a configuration of the IP telephone apparatus according to the first embodiment of the present invention.

FIG. 2 is a block diagram illustrating a configuration of IP telephone apparatus 101 according to the present embodiment. IP telephone apparatus 102 has the same configuration as IP telephone apparatus 101.

In FIG. 2, IP telephone apparatus 101 is configured mainly with CPU 201, memory 202, handset 203, display 204 and network-interface 205 (henceforth referred to as a network I/F).

CPU (Central Processing Unit) 201 controls operations to perform voice communication with another IP telephone apparatus 102 via IP network 105 based on the program for controlling voice communication. The program is stored in memory 202. CPU 201, therefore, controls a call with the destination terminal, according to a call control protocol, such as SIP (Session Initiation Protocol) and H.323. CPU 201 also provides instructions necessary for display 204 and network I/F 205.

In addition, CPU 201 controls the transmission of the message "Request the NAPTR record" to ENUM server 103 and the reception of the message "Respond to the NAPTR SIP service" from ENUM server 103. The message "Request the NAPTR record" is transmitted for requesting a NAPTR record corresponding to a destination terminal. The message "Respond to the NAPTR SIP service" is transmitted in response to the message "Request the NAPTR record". CPU 201 also controls automatically to transmit, from network I/F 205 to ENUM server 103, a request for the registration of information regarding the terminal apparatus (for example, a NAPTR resource record of the terminal apparatus) which is previously stored in memory 202. This occurs when the switch is turned ON after IP telephone apparatus 101 is installed and connected to IP network 105 or when the predetermined "available key" provided on the IP telephone apparatus is selected. CPU 201 controls the reception of the message "Respond indicating completion of the registration" in response to the registration request. The "predetermined key" is provided on IP telephone apparatus 101 that has a function to indicate that the user is available. The predetermined key is selected when the user is available to answer the phone, for example, the user returns from being outside or from being away from his desk. As explained later, when the predetermined key is selected, IP telephone apparatus 101 notifies, to the predetermined IP telephone terminal(s), that the user of IP telephone apparatus 101 is home or is at his desk. An absent key is also provided on IP telephone apparatus 101. The absent key indicates that the user of IP telephone apparatus 101 is not available, for example, the user of IP telephone apparatus 101 is not home or is not at his desk. The absent key can be combined with the conventional "answering machine key", which is contained in the answering machine telephone function. In this case, the absent key can have the same function as the predetermined key, and IP telephone apparatus 101 can have the answering machine telephone function which includes an answering record mode. When the answering machine telephone function is released, IP telephone apparatus 101 can perform the same process as when "the predetermined key" is selected.

When IP telephone apparatus 101 places a call to IP telephone apparatus 102, CPU 201 transmits, to ENUM serer 103, the message "Request the NAPTR record of IP telephone apparatus 102". Then, CPU 201 obtains the NAPTR record of IP telephone apparatus 102 from the message "Respond to the NAPTR SIP service of IP telephone apparatus 102" in response to the message "Request NAPTR record of IP telephone apparatus 102". CPU 201 also transmits, to DNS server 104, the message "Request the IP address of IP telephone apparatus 102" based on the NAPTR record. CPU 201 further obtains the IP address of IP telephone apparatus 102 from the message "Respond to the IP address of IP telephone apparatus 102" in response to the message "Request the IP address of IP telephone apparatus 102".

Additionally, CPU 201 transmits, to IP telephone apparatus 102, the message "Notify that the user of IP telephone apparatus 101 is available" based on the obtained IP address and receives, from IP telephone apparatus 102, the response to the message "Notify that the user of IP telephone apparatus 101 is available". Furthermore, CPU 201 receives, from IP telephone apparatus 102, the message "Notify that the user of IP telephone apparatus 102 is available" and lights display lamp 305 that indicates that the user is available, based on the message "Notify that the user of IP telephone apparatus 102 is available". Display lamp 305 will be described later. CPU 201 also has a function as a unit configured to request the registration of a NAPTR resource record of IP telephone apparatus 101 and as an obtainer configured to obtain a NAPTR resource record of IP telephone apparatus 102. The function of transmitting the message "Notify that the user of IP telephone apparatus 101 is available" means that IP telephone apparatus 101 transmits, to a predetermined IP telephone apparatus pre-stored in IP telephone apparatus 101 (for example, IP telephone apparatus 102), the message notifying that the user of IP telephone apparatus 101 is available when the predetermined key of IP telephone apparatus 101 is selected. Upon receiving the message notifying that the user of IP telephone apparatus 101 is available, IP telephone apparatus 102 lights display lamp 305 on IP telephone apparatus 102. Lighting of display lamp 305 indicates that the user of IP telephone apparatus 101 is available.

Memory 202 has a function as a ROM (Read Only Memory) that stores a program for controlling voice communication and so on that is conducted by CPU 201. Memory 202 also has a function as a RAM (Random Access Memory), which is used as a work-memory when CPU 201 performs a program. Additionally, memory 202 has an area configured to store the terminal information regarding IP telephone apparatus 101 (the NAPTR record of IP telephone apparatus 101); an area configured to store the telephone number of the call destination, to which the notification is provided to indicate that the user of IP telephone apparatus 101 is available; and an area configured to store the IP address of IP telephone apparatus 102 obtained from DNS server 104. Memory 202 further functions as a memory.

Handset 203 outputs, to CPU 201, one of an off-hook signal and an on-hook signal, according to one of the off-hook operation and an on-hook operation performed by the user. Handset 203 also contains a microphone and a speaker. Handset 203 converts the user's transmitted voice into the transmitted voice signal and outputs, to CPU 201, the converted voice signal during voice communication between the source and destination terminals. At the same time, handset 203 inputs, from CPU 201, the received voice signal and outputs the received voice signal as received voice via the speaker.

Display 204 is configured with a liquid crystal panel and so forth. Display 204 displays the current status of IP telephone apparatus 101 as well as the name, the address, the telephone number, etc. of the source IP telephone apparatus input by CPU 201.

Network I/F 205 is an interface for IP network 105 that is connected to IP telephone apparatus 101. Based upon the control of the above-described CPU 201, network I/F 205 performs the process of transmission to and reception from ENUM server 103 when a request for the registration and a response of the completion of the registration are made. Network I/F 205 also performs the process of transmission and reception of the notification that the user is available and a response to this notification. Network I/F 205 further functions as a transmitter and a receiver.

Figure 3:
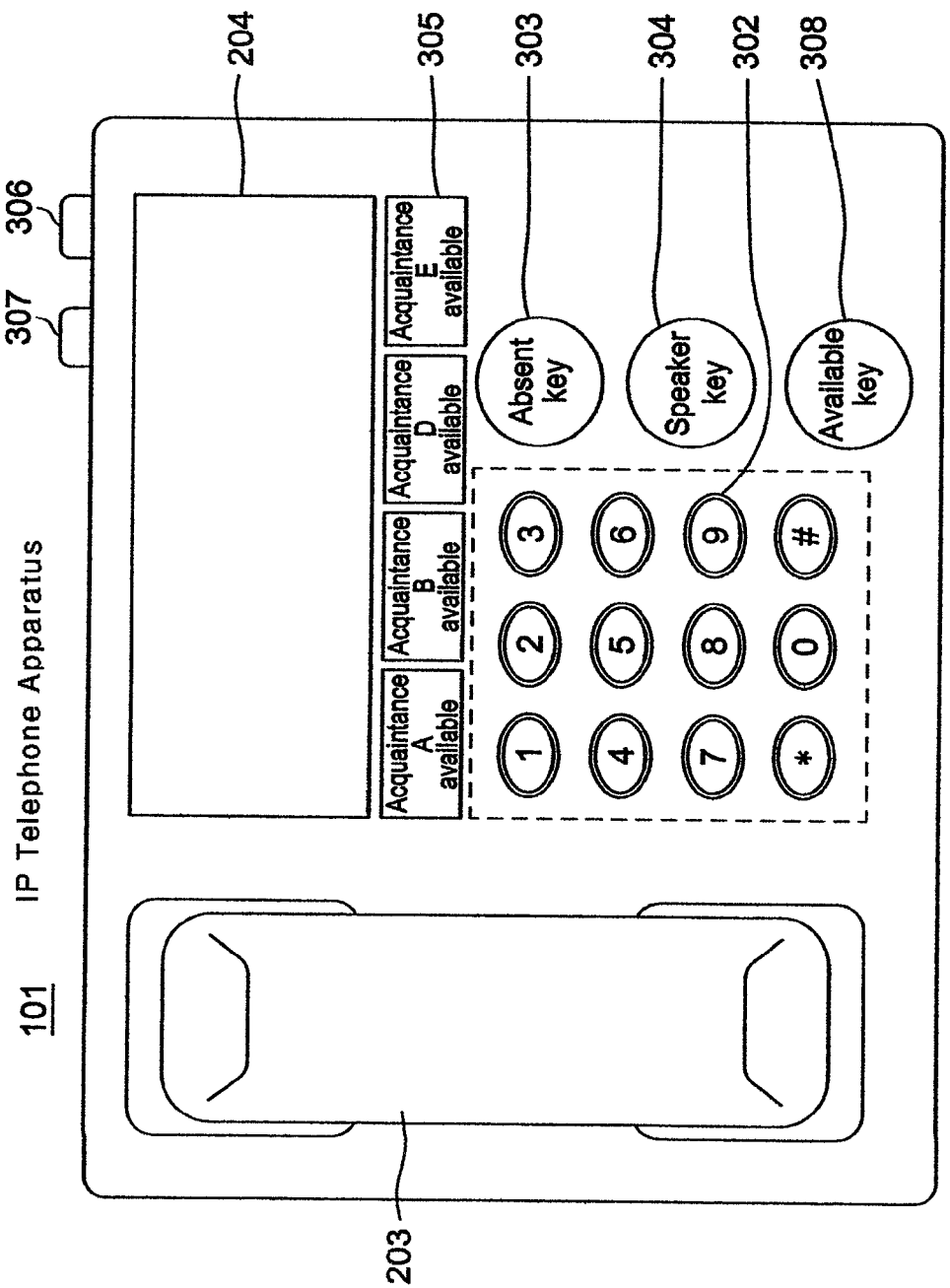
FIG. 3 illustrates a front view describing the appearance of the IP telephone apparatus shown in FIG. 2.

FIG. 3 is a front view illustrating the appearance of IP telephone apparatus 101 according to the present embodiment. IP telephone apparatus 102 has the same configuration.

In FIG. 3, IP telephone apparatus 101 includes a microphone, handset 203, ten-key pad 302, absent key 303, speaker key 304 and display lamp 305. The microphone receives a user's voice. Handset 203 has a speaker that outputs the received voice. Ten-key pad 302 inputs telephone numbers and so on. Absent key 303 indicates that the user of the IP telephone apparatus is not available. Absent key 303 can switch on and off the answering machine telephone function. Speaker key 304 switches output of the voice from the speaker of handset 203 to an external speaker. Display lamp 305 shows that the user of another IP telephone apparatus is available. On the side area, IP telephone apparatus 101 contains LAN interface (LAN I/F) 306 and public line interface (public line I/F) 307. IP telephone apparatus 101 further contains available key 308. The LAN interface is connected to IP network 105. The public line interface is connected to the public line network. Available key 308 indicates that the user of the IP telephone apparatus is available as previously described. Available key 308 also functions as an instruction unit.

Above display lamp 305 to indicate that the user is available, display 204 is provided. Display 204 is configured a liquid crystal panel and so on. Display 204 displays the email address, the website URL and the number of the source IP telephone apparatus that are received from ENUM server 103. Display lamp 305 is able to display for up to four users of the IP telephone apparatuses a notification that the users are available. FIG. 3 illustrates an instance where the display lamps are configured to display the information regarding acquaintance A, acquaintance B, acquaintance D and acquaintance E. Display lamp 305 also functions as a display.

Figure 4:
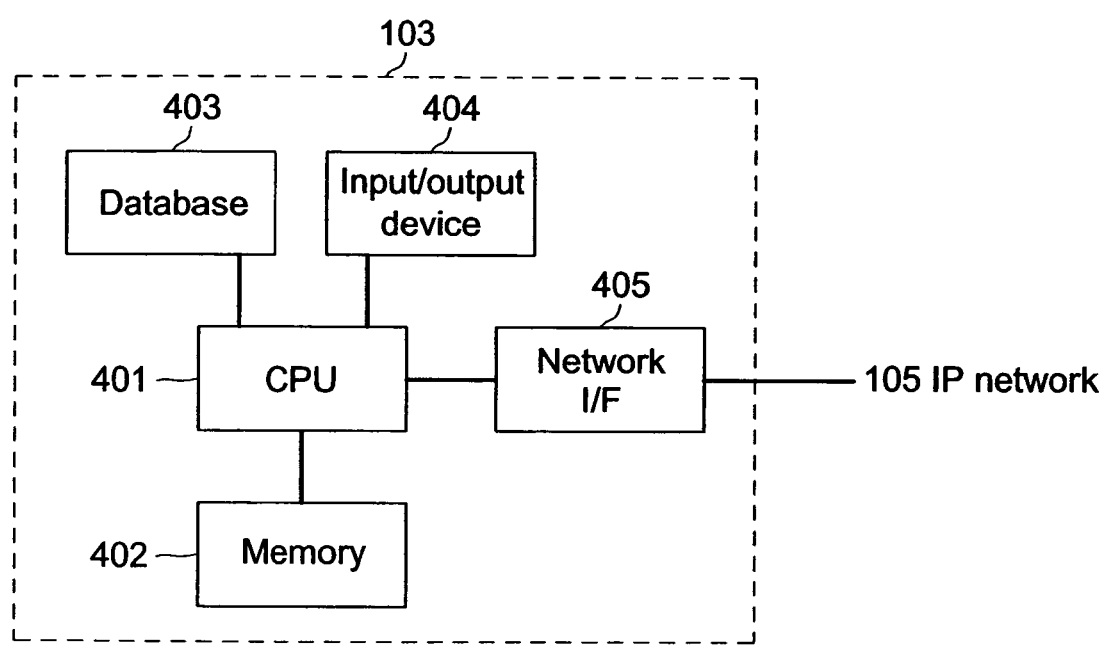
FIG. 4 illustrates a block diagram describing a configuration of the ENUM server according to the first embodiment of the present invention.

FIG. 4 is a block diagram illustrating the configuration of ENUM server 103 according to the embodiment of the present invention. In FIG. 4, ENUM server 103 is configured mainly with CPU 401, memory 402, database 403, input/output device 404 and network I/F 405.

CPU 401 controls the entire operation of ENUM server 103 based on the control program stored in memory 402. CPU 401, for example, starts application software such as "Nsupdate" upon receiving, from IP telephone apparatus 101, a request for the registration of information regarding the apparatus terminal. Then, CPU 401 stores, in database 403 described later, a NAPTR record of IP telephone apparatus 101 and returns, from network I/F 405 to IP telephone apparatus 101, the response indicating that the registration is completed. CPU 401 also functions as a register.

Memory 402 has a function as a ROM that stores a control program and so on that is performed by CPU 401. Memory 402 also functions as a RAM that is used as a work-memory when CPU 401 performs a program.

Database 403 is a database that stores a NAPTR record of IP telephone apparatus 101 and a NAPTR record of IP telephone apparatus 102. Input/output device 404 is configured with an input device and with an output device. The input device includes a keyboard that is used when ENUM server 103 is maintained. The output device includes a display that displays the maintenance information. Database 403 also functions as a memory.

Network I/F 405 is an interface to IP network 105 that is connected with ENUM server 103. Network I/F 405 receives a request for the registration from IP telephone apparatus 101 or IP telephone apparatus 102 based on the control of CPU 401. Network I/F 405 also returns, to IP telephone apparatus 101 or IP telephone apparatus 102, the message indicating that the registration is completed. Further, network I/F 405 functions as a receiver and as a transmitter.

The following describes the operation of IP telephone system 100 as shown in FIG. 1 from a case when the request for the registration is transmitted to a case when the voice communication is established. The description refers to the sequence diagram shown in FIG. 5. At first, IP telephone apparatus 101 and IP telephone apparatus 102 transmit, to ENUM server 103, a request for the registration of a NAPTR record. Then, IP telephone apparatus 101 transmits, to IP telephone apparatus 102, the notification that the user of IP telephone apparatus 101 is available. Then, IP telephone apparatus 101 and IP telephone apparatus 102 start voice communication.

Figure 5:
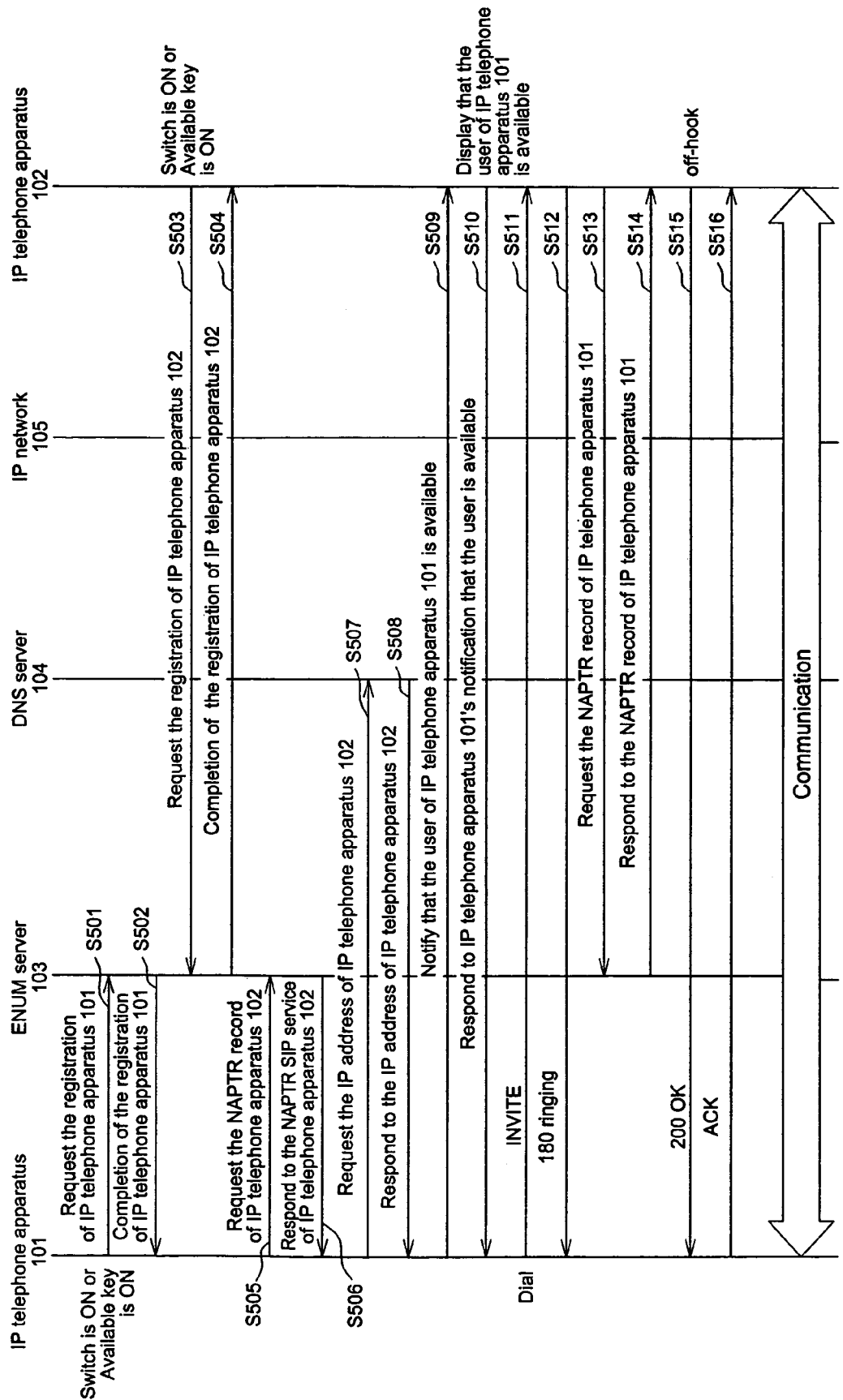
FIG. 5 illustrates a sequence diagram describing an IP telephone system according to the first embodiment of the present invention; from when the IP telephone apparatus transmits, to the ENUM server, a request for the registration of a NAPTR record, to when the communication between the IP telephones is established.

As a premise of describing the operation of FIG. 5, memories 202 of both IP telephone apparatus 101 and IP telephone apparatus 102 store the NAPTR record information, which is the terminal information of the respective apparatuses and store the telephone number of the IP telephone terminal, to which the notification that the user of another IP telephone apparatus is available should be transmitted. DNS server 104 stores the IP addresses of both IP telephone apparatus 101 and IP telephone apparatus 102.

When the switch is turned ON after the installation process for connecting, etc., IP telephone apparatus 101 to IP network 105 is completed or when the predetermined key indicating that the user of IP telephone apparatus 101 is available is selected, CPU 201 in IP telephone apparatus 101 reads the apparatus information, e.g., the NAPTR record of IP telephone apparatus 101 from memory 202 in order to store the NAPTR record of IP telephone apparatus 101 in the database of ENUM server 103. Then, CPU 201 transmits, to ENUM server 103, a message "Request the registration of the NAPTR record of IP telephone apparatus 101" including the NAPTR record of IP telephone apparatus 101 (step S501).

According to the embodiment of the present invention, IP telephone apparatus 101 transmits the message "Request the registration of the NAPTR record of IP telephone apparatus 101" and stores the NAPTR record of IP telephone apparatus 101 in ENUM server 103.

Next, upon receiving the message "Request the registration of the NAPTR record of IP telephone apparatus 101" from IP telephone apparatus 101, ENUM server 103 starts application software such as "Nsupdate". Then, ENUM server 103 stores, in database 403, the NAPTR record included in the message "Request the registration of the NAPTR record of IP telephone apparatus 101". Next, ENUM server 103 returns, to IP telephone apparatus 101, the message "Completion of the registration of the NAPTR record of IP telephone apparatus 101" (step S502).

Next, the installation of IP telephone apparatus 102 for connecting IP telephone apparatus 102 to IP network 105 is completed, and IP telephone apparatus 102 is turned ON. Or the predetermined key 308 is selected, the predetermined key 308 being provided on IP telephone apparatus 102 and indicating that the user of IP telephone apparatus 102 is available. Then, CPU 201 in IP telephone apparatus 102 reads the NAPTR record of IP telephone apparatus 102 from memory 202 in order to store the NAPTR record of IP telephone apparatus 102 into the database of ENUM server 103. Then, CPU 201 transmits, to ENUM server 103, the message "Request the registration of the NAPTR record of IP telephone apparatus 102" including the NAPTR record (step S503).

Next, ENUM server 103 receives the message "Request the registration of the NAPTR record of IP telephone apparatus 102" from IP telephone apparatus 101. Then, ENUM server 103 starts application software such as "Nsupdate". Then, ENUM server 103 stores, in database 403, the NAPTR record included in the message "Request the registration of the NAPTR record of IP telephone apparatus 102". ENUM server 103 returns, to IP telephone apparatus 102, the message "Completion of the registration of the NAPTR record of IP telephone apparatus 102" (step S504).

With the above-described processes according to step S501 through step S504, IP telephone apparatus 101 and IP telephone apparatus 102 complete the process for registering respective NAPTR records into ENUM server 103. FIG. 11 illustrates an example where the respective NAPTR records of both IP telephone apparatus 101 and IP telephone apparatus 102 are stored in database 403 of ENUM server 103. In FIG. 11, the first three lines indicate an example of NAPTR records corresponding to domain names obtained from telephone number "0310000000" of IP telephone apparatus 101. The last three lines indicate an example of NAPTR records corresponding to domain names obtained from telephone number "0310000001" of IP telephone apparatus 102.

In FIG. 11, URI scheme "sip: 81310000000.tokyo.sip.jp" is stored corresponding to domain name "0.0.0.0.0.0.0.1.3.1.8.e164.arpa" that is obtained from telephone number "310000000" of IP telephone apparatus 101. "E2U+sip", which indicates that the destination terminal comprises the IP telephone apparatus, is also stored as the service field. Telephone number "310000000" is first converted into "81310000000" including the country code. Then, dots are inserted between the numbers, resulting in "8.1.3.1.0.0.0.0.0.0.0". Next, the numbers are reversed, and a data string ".e164.arpa" is added at the end and then converted into domain name "0.0.0.0.0.0.0.1.3.1.8.e164.arpa".

Furthermore, URI scheme "mailto: 81310000000@tokyo.mail.com" is stored as e-mail address "81310000000@tokyo.mail.com" of IP telephone apparatus 101. "E2U+message: mailto" is also stored as the service field. "E2U+message: mailto" indicates that the destination terminal can perform e-mail transmission. Further, URI scheme "http://www.tokyo.sip.com/user81310000000.html" and "E2U+http" indicating that destination terminal can deal with the HTML are stored as a reference URL "www.tokyo.sip.com/user81310000000.html" of IP telephone apparatus 101.

Additionally, in FIG. 11, URI scheme "sip: 81310000001.tokyo.sip.jp" and the service field "E2U+sip" are stored corresponding to domain name "1.0.0.0.0.0.0.1.3.1.8. e164.arpa" obtained from telephone number "310000001" of IP telephone apparatus 102. URI scheme "mailto: 81310000001@tokyo.mail.com" and the service field "E2U+message: mailto" are also stored corresponding to domain name "1.0.0.0.0.0.0.1.3.1.8.e164.arpa". Further, URI scheme "http://www.tokyo.sip.com/user81310000001.html" and the service field "E2U+http" are stored corresponding to domain name "1.0.0.0.0.0.0.1.3.1.8.e164.arpa".

Also, the service field "E2U+sip", the service field "E2U+message: mailto" and the service field "E2U+http" correspond to Order=100 respectively. The order value refers to the priority of the service.

Next, when IP telephone apparatus 101 completes the process for registering, to ENUM server 103, the NAPTR record of IP telephone apparatus 101, IP telephone apparatus 101 reads, from memory 202, the predetermined telephone number (in the embodiment, the telephone number of IP telephone apparatus 102). The telephone number is pre-set by the user, as the telephone number of the destination to which the notification of the user being available should be transmitted. IP telephone apparatus 101 transmits, to ENUM server 103, the message "Request the NAPTR record of IP telephone apparatus 102" in order to notify IP telephone apparatus 102 that the user of IP telephone apparatus 101 is available (step S505). Upon receiving, from IP telephone apparatus 101, the message "Request the NAPTR record of IP telephone 102", ENUM server 103 reads the NAPTR record of IP telephone apparatus 102 from database 403. Then, ENUM server returns, to IP telephone apparatus 101, the message "Respond to the NAPTR SIP service of IP telephone apparatus 102" including the NAPTR record (step S506). Then, IP telephone apparatus 101 stores, in memory 202, the NAPTR record of IP telephone apparatus 102 obtained from ENUM server 103.

Next, when IP telephone apparatus 101 receives, from ENUM server 103, the message "Respond to the NAPTR SIP service of IP telephone apparatus 102", IP telephone apparatus 101 obtains the URI from the NAPTR record included in the message "Respond to the NAPTR SIP service of IP telephone apparatus 102". Further, IP telephone apparatus 101 transmits, to DNS server 104, the message "Request the IP address of IP telephone apparatus 102" including the URI in order to obtain the IP address corresponding to the URI (step S507).

Next, DNS server 104 receives the message "Request the IP address of IP telephone apparatus 102" from IP telephone apparatus 101. Then, DNS server 104 reads, from the database, the IP address corresponding to the URI included in the received message "Request the IP address of IP telephone apparatus 102". Next, DNS server 104 returns, to IP telephone apparatus 101, the message "Respond to the IP address of IP telephone apparatus 102" including the IP address (step S508).

With the above-described processes according to step S505 through step S508, IP telephone apparatus 101 obtains the IP address of IP telephone apparatus 102, which is a call destination. The obtained IP address of IP telephone apparatus 102 is stored in memory 202 corresponding to the telephone number of IP telephone apparatus 102.

Next, CPU 201 in IP telephone apparatus 101 recognizes that the user of IP telephone apparatus 101 is available and transmits, to IP telephone apparatus 102, whose IP address is previously obtained, the message "Notify that the user of IP telephone apparatus 101 is available" (step S509). Upon receiving the message "Notify that the user of IP telephone apparatus 101 is available", IP telephone apparatus 102 recognizes that the user of IP telephone apparatus 101 is available and lights display lamp 305 corresponding to the message indicating that the user is available. Then, IP telephone apparatus 102 returns, to IP telephone apparatus 101, the message "Respond to IP telephone apparatus 101's notification that the user is available" (step S510).

With the above-described processes according to step S509 through step S510, the user of IP telephone apparatus 102 can confirm that the user of IP telephone apparatus 101 is available. By performing the same process, the user of IP telephone apparatus 101 can also confirm that the user of IP telephone apparatus 102 is available by looking at display lamp 305.

Next, the following describes an example where the user of IP telephone apparatus 101 places a call to IP telephone apparatus 102 after the user of IP telephone apparatus 101 confirms that the user of IP telephone apparatus 102 is available by looking at the display lamp indicating that the user of IP telephone apparatus 102 is available. IP telephone apparatus 101 reads, from memory 202, the IP address corresponding to telephone number "310000001" when the user dials the telephone number of IP telephone apparatus 102 "310000001". Then, IP telephone apparatus 101 transmits, from network I/F 205 to IP telephone apparatus 102, the message "INVITE" including the telephone number of IP telephone apparatus 101 and the telephone number of IP telephone apparatus 102 (step S511). Upon receiving the message "INVITE" from IP telephone apparatus 101, IP telephone apparatus 102 returns, to IP telephone apparatus 101, the message "180 ringing" (step S512).

Next, when IP telephone apparatus 101 receives the message "180 ringing" from IP telephone apparatus 102, the speaker of handset 203 produces a ring-back tone in order to notify the user that IP telephone apparatus 102, which is a call destination, is being called.

Next, IP telephone apparatus 102, which is a call destination, transmits, to ENUM server 103, the message "Request the NAPTR record of IP telephone apparatus 101". This message is a request for the NAPTR record of IP telephone apparatus 101, which is a source IP telephone apparatus, in order to display the user information of IP telephone apparatus 101 on a display of IP telephone apparatus 102 (step S513). IP telephone apparatus 102 can transmit the message "Request the NAPTR record of IP telephone apparatus 101" by using the telephone number of the source IP telephone apparatus included in the message "INVITE" of step S511. Upon receiving the message "Request the NAPTR record of IP telephone apparatus 101" from IP telephone apparatus 102, ENUM server 103 extracts the NAPTR record of IP telephone apparatus 101 stored in database 403. Then, ENUM server 103 returns, to IP telephone apparatus 102, the message "Respond to the NAPTR record of IP telephone apparatus 101" including the NAPTR record of IP telephone apparatus 101 (step S514).

Next, upon receiving the message "Respond to the NAPTR record of IP telephone apparatus 101" from ENUM server 103, IP telephone apparatus 102 displays, on display 204, the user information of IP telephone apparatus 101 based on the NAPTR record included in the message "Respond to the NAPTR record of IP telephone apparatus 101". Then, IP telephone apparatus 102 sounds a ringing tone to notify the user of IP telephone apparatus 102 that the call is being received. The user of IP telephone apparatus 102 can confirm the user of the source IP telephone apparatus, based on one of the e-mail address, website URL and telephone number displayed on display 204.

Next, when the user of IP telephone apparatus 102 takes handset 203 off the hook, IP telephone apparatus 102 transmits, to IP telephone apparatus 101, the message "200OK" indicating that a connection has been approved (step S515). Upon receiving the message "200OK" from IP telephone apparatus 102, IP telephone apparatus 101 returns the message "ACK" to IP telephone apparatus 102 (step S516). When IP telephone apparatus 102 receives the message "ACK" from IP telephone apparatus 101, voice communication becomes available between IP telephone apparatus 101 and IP telephone apparatus 102.

Figure 6:
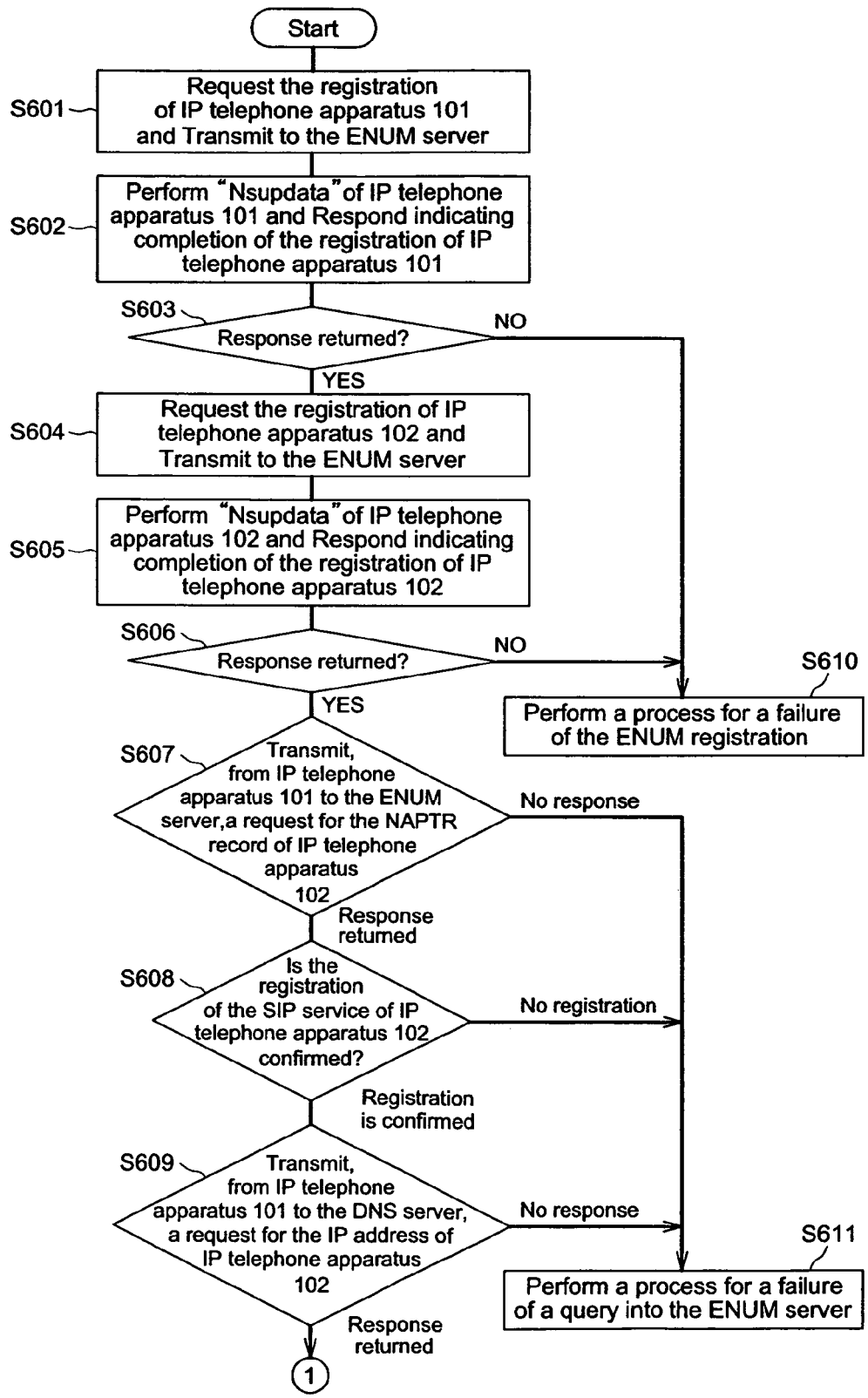
FIG. 6 illustrates a flow chart describing the operation of the IP telephone system according to the sequence diagram shown in FIG. 5.
Figure 7:
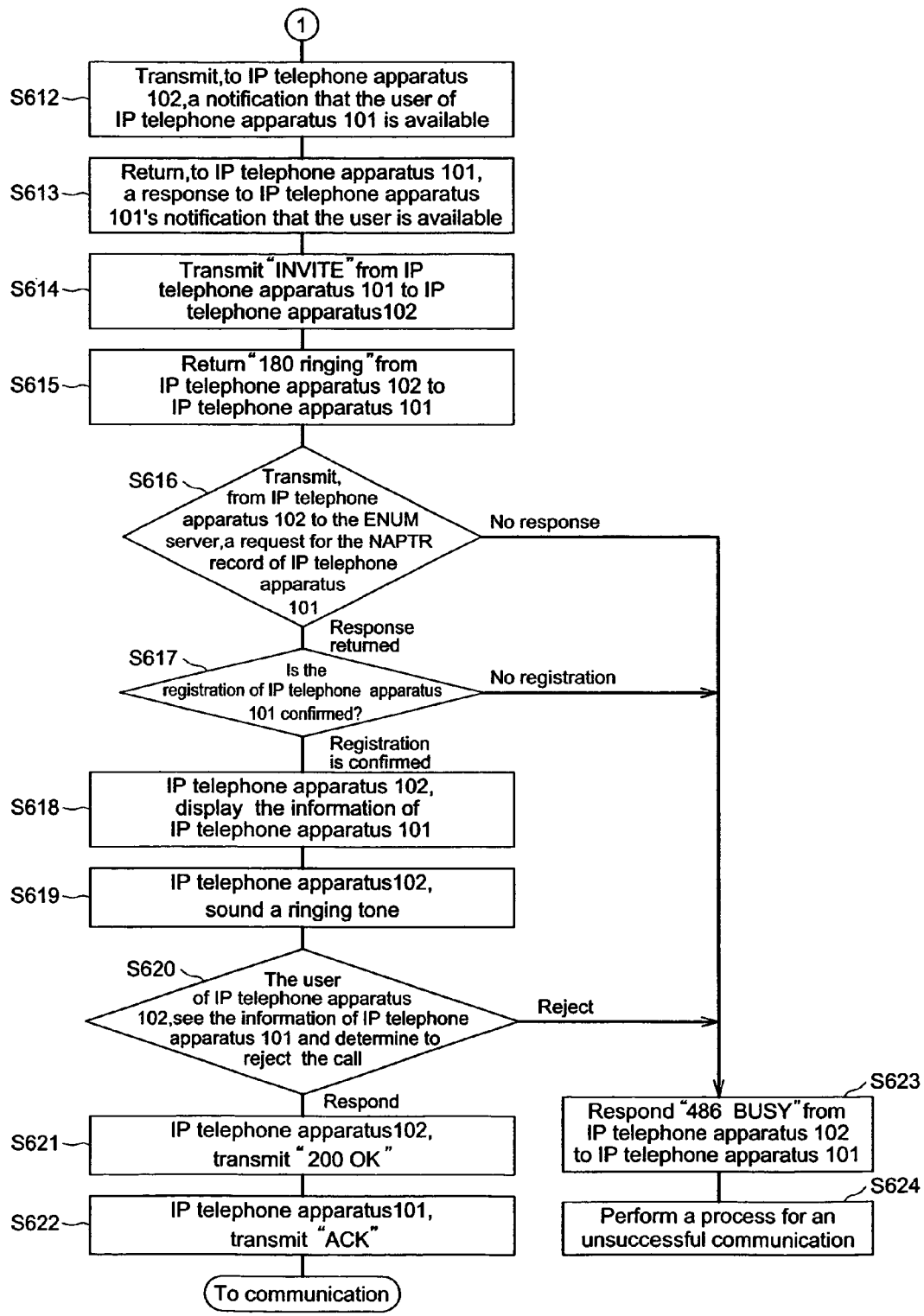
FIG. 7 illustrates a flow chart describing the operation sequent to the operation according to FIG. 6.

Next, the following describes the operation of IP telephone apparatus 101, IP telephone apparatus 102, ENUM server 103 and DNS server 104 according to the sequence diagram shown in FIG. 5 with reference to the flowcharts illustrated in FIG. 6 and FIG. 7.

When the switch is turned ON after the installation process for connecting, etc., IP telephone apparatus 101 to IP network 105 is completed or when the predetermined key indicating that the user of IP telephone apparatus 101 is available is selected, CPU 201 in IP telephone apparatus 101 transmits, to ENUM server 103, the message "Request the registration of the NAPTR record of IP telephone apparatus 101" in order to store, in the database of ENUM server 103, the apparatus information, e.g., the NAPTR record of IP telephone apparatus 101 (step S601). According to the embodiment, IP telephone apparatus 101 stores, in ENUM server 103, the NAPTR record of IP telephone apparatus 101 by transmitting the message "Request the registration of the NAPTR record of IP telephone apparatus 101" to ENUM server 103.

Next, upon receiving the message "Request the registration of the NAPTR record of IP telephone apparatus 101" from IP telephone apparatus 101, ENUM server 103 starts application software such as "Nsupdate". Then, ENUM server 103 stores, in database 403, the NAPTR record included in the message "Request the registration of the NAPTR record of IP telephone apparatus 101". Next, ENUM server 103 returns, to IP telephone apparatus 101, the message "Completion of the registration of the NAPTR record of IP telephone apparatus 101" (step S602).

Next, IP telephone apparatus 101 determines whether or not IP telephone apparatus 101 receives a response to the message "Completion of the registration of the NAPTR record of IP telephone apparatus 101" from ENUM server 103 (step S603). Upon receiving the message "Completion of the registration of the NAPTR record of IP telephone apparatus 101" from ENUM server 103 (step S603: YES), IP telephone apparatus 101 completes the registration of the NAPTR record of IP telephone apparatus 101.

Next, when the switch is turned ON after the installation process for connecting, etc., IP telephone apparatus 102 to IP network 105 is completed or when the predetermined key indicating that the user of IP telephone apparatus 102 is available is selected, CPU 201 in IP telephone apparatus 102 transmits, to ENUM server 103, the message "Request the registration of the NAPTR record of IP telephone apparatus 102" in order to store, in the database of ENUM server 103, the apparatus information, e.g., NAPTR record of IP telephone apparatus 102 (step S604). Then, CPU 201 stores the NAPTR record of IP telephone apparatus 102 in ENUM server 103 by transmitting the message "Request the registration of the NAPTR record of IP telephone apparatus 102".

Next, upon receiving the message "Request the registration of the NAPTR record of IP telephone apparatus 102" from IP telephone apparatus 102, ENUM server 103 starts application software such as "Nsupdate". Then, ENUM server 103 stores, in database 403, the NAPTR record of IP telephone apparatus 102 included in the message "Request the registration of the NAPTR record of IP telephone apparatus 102". Next, ENUM server 103 returns, to IP telephone apparatus 102, the message "Completion of the registration of the NAPTR record of IP telephone apparatus 102" (step S605).

Next, IP telephone apparatus 102 determines whether or not IP telephone apparatus 102 receives a response to the message "Completion of the registration of the NAPTR record of IP telephone apparatus 102" from ENUM server 103 (step S606) Upon receiving the message "Completion of the registration of the NAPTR record of IP telephone apparatus 102" from ENUM server 103 (step S603: YES), IP telephone apparatus 102 completes the registration of the NAPTR record.

Additionally, in step S603, upon determining that IP telephone apparatus 101 does not receive the response to the message "Completion of the registration of the NAPTR record of IP telephone apparatus 101" from ENUM server 103 (step S603: NO), IP telephone apparatus 101 performs a process indicating that the registration to ENUM server 103 has failed (step S610). Likewise, upon determining that IP telephone apparatus 102 does not receive the message "Completion of the registration of the NAPTR record of IP telephone apparatus 102" from ENUM server 103 (step S606: NO), IP telephone apparatus 102 performs a process indicating that the registration to ENUM server 103 has failed (step S610).

Next, IP telephone apparatus 101 transmits, to ENUM server 103, the message "Request the NAPTR record of IP telephone apparatus 102" in order to notify IP telephone apparatus 102, which is a call destination, that the user of IP telephone apparatus 101 is available (step S607). Upon receiving, from IP telephone apparatus 101, the message "Request the NAPTR record of IP telephone apparatus 102" (step S607: response returned), ENUM server 103 confirms the registration of the NAPTR record of IP telephone apparatus 102 in database 403 (step S608). When the NAPTR record of IP telephone apparatus 102 is stored in database 403 (step S608: registration is confirmed), ENUM server 103 reads, from database 403, the NAPTR record of IP telephone apparatus 102. Then, ENUM server 103 returns, to IP telephone apparatus 101, the message "Respond to the NAPTR SIP service of IP telephone apparatus 102" including the NAPTR record of IP telephone apparatus 102. Then, IP telephone apparatus 101 stores, in memory 202, the NAPTR record of IP telephone apparatus 102 obtained from ENUM server 103.

Next, IP telephone apparatus 101 receives, from ENUM server 103, the message "Respond to the NAPTR SIP service of IP telephone apparatus 102". Then, IP telephone apparatus 101 confirms the registration of the SIP service of IP telephone apparatus 102 by confirming whether or not the service field "E2U+sip" is specified in the NAPTR record included in the message "Respond to the NAPTR SIP service of IP telephone apparatus 102" (step S608). When the service field "E2U+sip" is specified in the NAPTR record (step S608: registration is confirmed), IP telephone apparatus 101 obtains the URI of IP telephone apparatus 102 from the NAPTR record.

Then, IP telephone apparatus 101 transmits, to DNS server 104, the message "Request the IP address of IP telephone apparatus 102" including the URI in order to obtain the IP address corresponding to the URI. Then, IP telephone apparatus 101 confirms whether or not the response is returned from DNS server 104 (step S609).

Upon receiving the message "Respond to the IP address of IP telephone apparatus 102" from DNS server 104 (step S609: response returned), IP telephone apparatus 101 stores, in memory 202, the IP address of IP telephone apparatus 102. The IP address of IP telephone apparatus 102 is included in the message "Respond to the IP address of telephone 102" corresponding to the telephone number of IP telephone apparatus 102.

In addition, when the message "Respond to the NAPTR SIP service of IP telephone apparatus 102" is not returned from ENUM server 103 (step S607: no response), when no service field "E2U+sip" is specified (step S608: no registration) or when the message "Respond to the IP address of IP telephone apparatus 102" is not returned from DNS server 104 (step S609: no response), IP telephone apparatus 101 performs a process for query failure into ENUM server 103 (step S611).

Next, IP telephone apparatus 101 transmits, to IP telephone apparatus 102, whose IP address was obtained, the message "Notify that the user of IP telephone apparatus 101 is available" (step S612). Upon receiving the message "Notify that the user of IP telephone apparatus 101 is available", IP telephone apparatus 102 recognizes that the user of IP telephone apparatus 101 is available and lights display lamp 305 corresponding to the message indicating that the user is available. Then, IP telephone apparatus 102 returns, to IP telephone apparatus 101, the message "Respond to IP telephone apparatus 101's notification that the user is available" (step S613).

With the above-described processes of S612 and S613, the user of IP telephone apparatus 102 can always confirm that the user of IP telephone apparatus 101 is available.

Next, IP telephone apparatus 101 reads, from memory 202, the IP address corresponding to telephone number "310000001" when the user dials the telephone number of IP telephone apparatus 102 "310000001". Then, IP telephone apparatus 101 transmits, from network I/F 205 to IP telephone apparatus 102, the message "INVITE" including the telephone number of IP telephone apparatus 101 and the telephone number of IP telephone apparatus 102 (step S614). Upon receiving the message "INVITE" from IP telephone apparatus 101, IP telephone apparatus 102 returns, to IP telephone apparatus 101, the message "180 ringing" (step S615).

When IP telephone apparatus 101 receives the message "180 ringing" from IP telephone apparatus 102, the speaker of handset 203 produces the ring-back tone in order to notify the user that IP telephone apparatus 102, which is a call destination, is being called.

Next, IP telephone apparatus 102 transmits, to ENUM server 103, the message "Request the NAPTR record of IP telephone apparatus 101". This message is a request for the NAPTR record of IP telephone apparatus 101, which is a source telephone apparatus. Then, IP telephone apparatus 102 confirms whether a response is returned from ENUM server 103 (step S616). Upon receiving the message "Request the NAPTR record of IP telephone apparatus 101" from IP telephone apparatus 102 (step S616: response returned), ENUM server 103 extracts the NAPTR record of IP telephone apparatus 101 stored in database 403. Then, ENUM server 103 returns, to IP telephone apparatus 102, the message "Respond to the NAPTR record of IP telephone apparatus 101" in which the NAPTR record of IP telephone apparatus 101 is included.

IP telephone apparatus 102 receives, from ENUM server 103, the message "Respond to the NAPTR SIP for IP telephone apparatus 101" (step S616: response returned). Then, IP telephone apparatus 102 confirms the registration of the NAPTR record of IP telephone apparatus 101 by confirming whether or not a NAPTR record is included in the received message "Respond to the NAPTR SIP of IP telephone apparatus 101" (step S617). When the NAPTR record is confirmed (step S617: registration is confirmed), IP telephone apparatus 102 displays the user information of IP telephone apparatus 101 on display 204 (step S618). IP telephone apparatus 102 sounds a ringing tone to notify the user that the call is being received (step S619).

Next, the user of IP telephone apparatus 102 confirms the user of the source IP telephone apparatus, based on the information displayed on display 204 and determines whether to respond to or reject the call (step S620). The user of IP telephone apparatus 102 takes handset 203 off the hook in order to respond to the call (step S620: response). Upon confirming handset 203 is taken off the hook, CPU 201 in IP telephone apparatus 102 transmits, to IP telephone apparatus 101, the message "200OK" indicating that a connection has been approved (step S621). Upon receiving the message "200OK" from IP telephone apparatus 102, IP telephone apparatus 101 returns the message "ACK" to IP telephone apparatus 102 (step S622). When IP telephone apparatus 102 receives the message "ACK" from IP telephone apparatus 101, voice communication becomes available between IP telephone apparatus 101 and IP telephone apparatus 102.

Also, when the message "Respond to the NAPTR SIP service of IP telephone apparatus 101" is returned from ENUM server 103 (step S616: no response), when no registration is confirmed for the NAPTR record of IP telephone apparatus 101 (step S617: no registration) or when there is no off-hook operation by the user and the call is rejected (step S620: rejected), IP telephone apparatus 102 transmits, to IP telephone apparatus 101, the message "486BUSY" (step S623) and performs a process indicating that the communication was unsuccessful (step S624).

As described above, in IP telephone system 100 according to the present embodiment, IP telephone apparatus 101 and IP telephone apparatus 102 have a function of automatically storing the NAPTR record in ENUM server 103. As a result, IP telephone apparatus 101 and IP telephone apparatus 102 can save the user the trouble of storing the NAPTR record in ENUM server 103.

After IP telephone apparatus 101 stores the apparatus information in ENUM server 103, IP telephone apparatus 101 also has a function of performing, to ENUM server 103, a request for the NAPTR record of IP telephone apparatus 102, which is a call destination. A notification is provided to IP telephone apparatus 102. The notification indicates that the user of IP telephone apparatus 101 is available. IP telephone apparatus 101 also automatically performs a request for the IP address to DNS server 104. Similarly, IP telephone apparatus 102 has a function of performing a request, to ENUM server 103, for the NAPTR record of IP telephone apparatus 101. A notification is provided to IP telephone apparatus 101. The notification indicates that the user of IP telephone apparatus 102 is available. Additionally, IP telephone apparatus 102 automatically performs a request for the IP address to DNS server 104.

Further, IP telephone apparatus 101 has a function of notifying that the user of IP telephone apparatus 101 is available, to IP telephone apparatus 102, whose IP address IP telephone apparatus 101 has obtained. IP telephone apparatus 102 has a function of lighting display lamp 305 to indicate the user of IP telephone apparatus 101 is available, upon receiving the notification indicating that the user of IP telephone apparatus 101 is available. Therefore, the user of IP telephone apparatus 101 can notify that the user of IP telephone apparatus 101 is available to the users of IP telephones that are previously stored as call destinations, in a simple and convenient manner. The user of IP telephone apparatus 102 can avoid placing a call when the user of IP telephone apparatus 101 is not available since the user can confirm easily whether or not the user of IP telephone apparatus 101 is available.

Accordingly, by adopting the present invention to the IP telephone system, the user-friendly IP telephone system is provided for the users of IP telephone apparatuses.

In the above-described first embodiment, when IP telephone apparatus 101 and IP telephone apparatus 102 transmit, to ENUM server 103, a request for registering the apparatus information, IP telephone apparatus 101 and IP telephone apparatus 102 transmit, to ENUM server 103, the message "Request the registration of the NAPTR record of IP telephone apparatus 101 (102)". However, the present invention is not limited to this embodiment. For instance, by using a message "Notify Info" regulated by RFC3427, the NAPTR record of IP telephone apparatus 101 can be specified in the "P" header of the message "Notify Info" and can be transmitted to ENUM server 103.

Also, in the above-described first embodiment, IP telephone apparatus 101 notifies IP telephone apparatus 102 that the user of IP telephone apparatus 101 is available. However, it is also possible that the notification is transmitted from IP telephone apparatus 102 to IP telephone apparatus 101.

Second Embodiment

The second embodiment of the present invention describes voice communication via CA 106 between IP telephone apparatus 101 and IP telephone apparatus 102. The system configuration of the second embodiment, the configuration of IP telephone apparatus 101, IP telephone apparatus 102 and ENUM server 103 in the embodiment are the same as the configuration described in the first embodiment, and the description based on the drawings and regarding the configuration is thus omitted.

Figure 8:
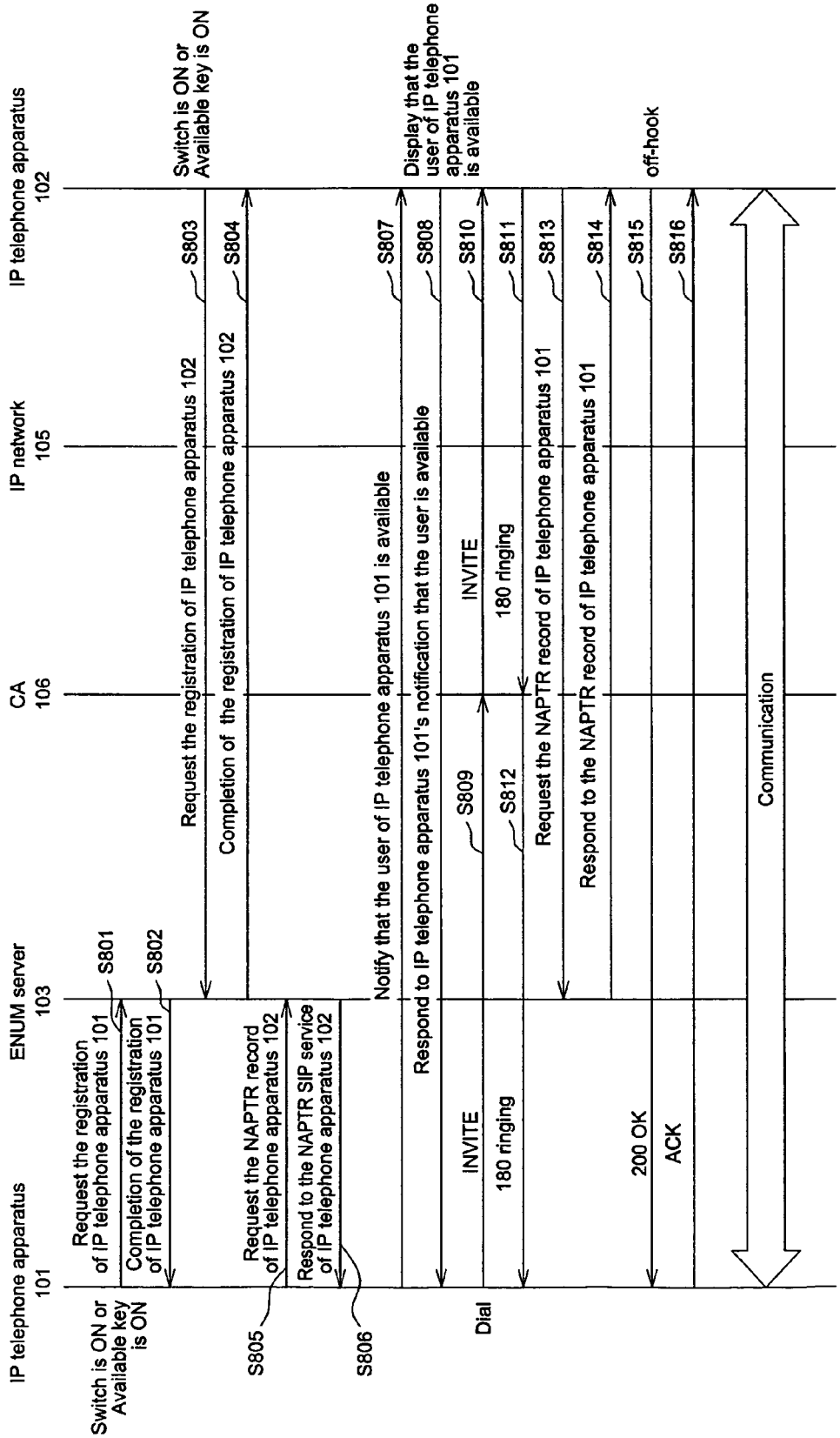
FIG. 8 illustrates a sequence diagram describing the IP telephone system according to the second embodiment of the present invention; from when the IP telephone apparatus transmits, to the ENUM server, a request for the registration of a NAPTR record, to when the communication between the IP telephone apparatuses is established.

The following describes the operation from when the request for the registration is transmitted to when the voice communication is established, with reference to the sequence diagram shown in FIG. 8. At first, IP telephone apparatus 101 and IP telephone apparatus 102 transmit, to ENUM server 103, a request for the registration of the apparatus information, e.g., the NAPTR record in IP telephone system 100 shown in FIG. 1. Then, IP telephone apparatus 101 transmits, to IP telephone apparatus 102, the notification that the user of IP telephone apparatus 101 is available. Then, IP telephone apparatus 101 and IP telephone apparatus 102 start voice communication via CA 106.

As a premise of describing the operation of FIG. 8, memories 202 of both IP telephone apparatus 101 and IP telephone apparatus 102 store the NAPTR record, which is the terminal information of the respective apparatuses, and store the telephone number of the IP telephone terminal, to which the notification that the user of another IP telephone apparatus is available should be transmitted.

IP telephone apparatus 101 and IP telephone apparatus 102 operate the same registration to ENUM server 103 according to step S801 through step S804 shown in FIG. 8 as the registration according to step S501 through step S504 shown in FIG. 5. The description of this operation is thus omitted. FIG. 8 omits the illustration of the DNS server. The same request for the IP address at step S507 and step S508 shown in FIG. 5 is transmitted to the DNS server between step S806 and step S807 shown in FIG. 8. Likewise, IP telephone apparatus 101 obtains the IP address of IP telephone apparatus 102 and transmits, to IP telephone apparatus 102, a message that the user of IP telephone apparatus 101 is available based on the obtained IP address. Accordingly, the same operation of notifying that the user that IP telephone apparatus 101 is available at step S509 and at step S510 shown in FIG. 5 is performed at step S807 and at step S808 shown in FIG. 8. The description of this operation is thus omitted.

IP telephone apparatus 101 reads, from memory 202, the IP address corresponding to telephone number "310000001" when the user dials telephone number "310000001" of IP telephone apparatus 102. Then, IP telephone apparatus 101 transmits, from network I/F 205 to CA 106, the message "INVITE" including the telephone number of IP telephone apparatus 101 and the telephone number of IP telephone apparatus 102 (step S809). Upon receiving the message "INVITE" from IP telephone apparatus 101, CA 106 extracts the telephone number of IP telephone apparatus 102, which is a call destination, from the "To" header that is included in the message "INVITE".

Then, CA 106 transmits, to IP telephone apparatus 102, which is a call destination, the message "INVITE" including the telephone number of IP telephone apparatus 101 and the telephone number of IP telephone apparatus 102 received from IP telephone apparatus 101 (step S810). Upon receiving the message "INVITE" from CA 106, IP telephone apparatus 102 sounds a ringing tone to notify the user that a call is being received and returns, to CA 106, a message "180 ringing" (step S811). CA 106 returns, to IP telephone apparatus 101, which is a source telephone apparatus, the message "180 ringing" received from IP telephone apparatus 102 (step S812).

Next, when IP telephone apparatus 101 receives the message "180 ringing" from CA 106, the speaker of handset 203 produces the ring-back tone in order to notify the user that IP telephone apparatus 102 which is a call destination, is being called.

Next, IP telephone apparatus 102 transmits, to ENUM server 103, the message "Request the NAPTR record of IP telephone apparatus 101". This message is a request for the NAPTR record of IP telephone apparatus 101, which is a call destination (step S813) in order to display the user information of the source IP telephone apparatus on the telephone apparatus. Upon receiving the message "Request the NAPTR record of IP telephone apparatus 101" from IP telephone apparatus 102, ENUM server 103 extracts the NAPTR record of IP telephone apparatus 101 stored in database 403. Then, ENUM server 103 returns, to IP telephone apparatus 102, the message "Respond to the NAPTR record of IP telephone apparatus 101" in which the NAPTR record of IP telephone apparatus 101 is included (step S814).

Next, upon receiving the message "Respond to the NAPTR record of IP telephone apparatus 101" from ENUM server 103, IP telephone apparatus 102 displays, on display 204, the user information of IP telephone apparatus 101, based on the NAPTR record included in the message "Respond to the NAPTR record of IP telephone apparatus 101". Then, IP telephone apparatus 102 sounds a ringing tone to notify the user that the call is being received. The user of IP telephone apparatus 102 can confirm the user of the source IP telephone apparatus based on the information displayed on display 204 prior to answering the phone.

Next, upon detecting the operation of handset 203 is taken off the hook by the user of IP telephone apparatus 102, which is a call destination, IP telephone apparatus 102 transmits the message "200OK" that indicates a connection has been approved to IP telephone apparatus 101 (step S815). Upon receiving the message "200OK" from IP telephone apparatus 102, IP telephone apparatus 101 returns the message "ACK" to IP telephone apparatus 102 (step S816). When IP telephone apparatus 102 receives the message "ACK" from IP telephone apparatus 101, voice communication becomes available between IP telephone apparatus 101 and IP telephone apparatus 102.

Figure 9:
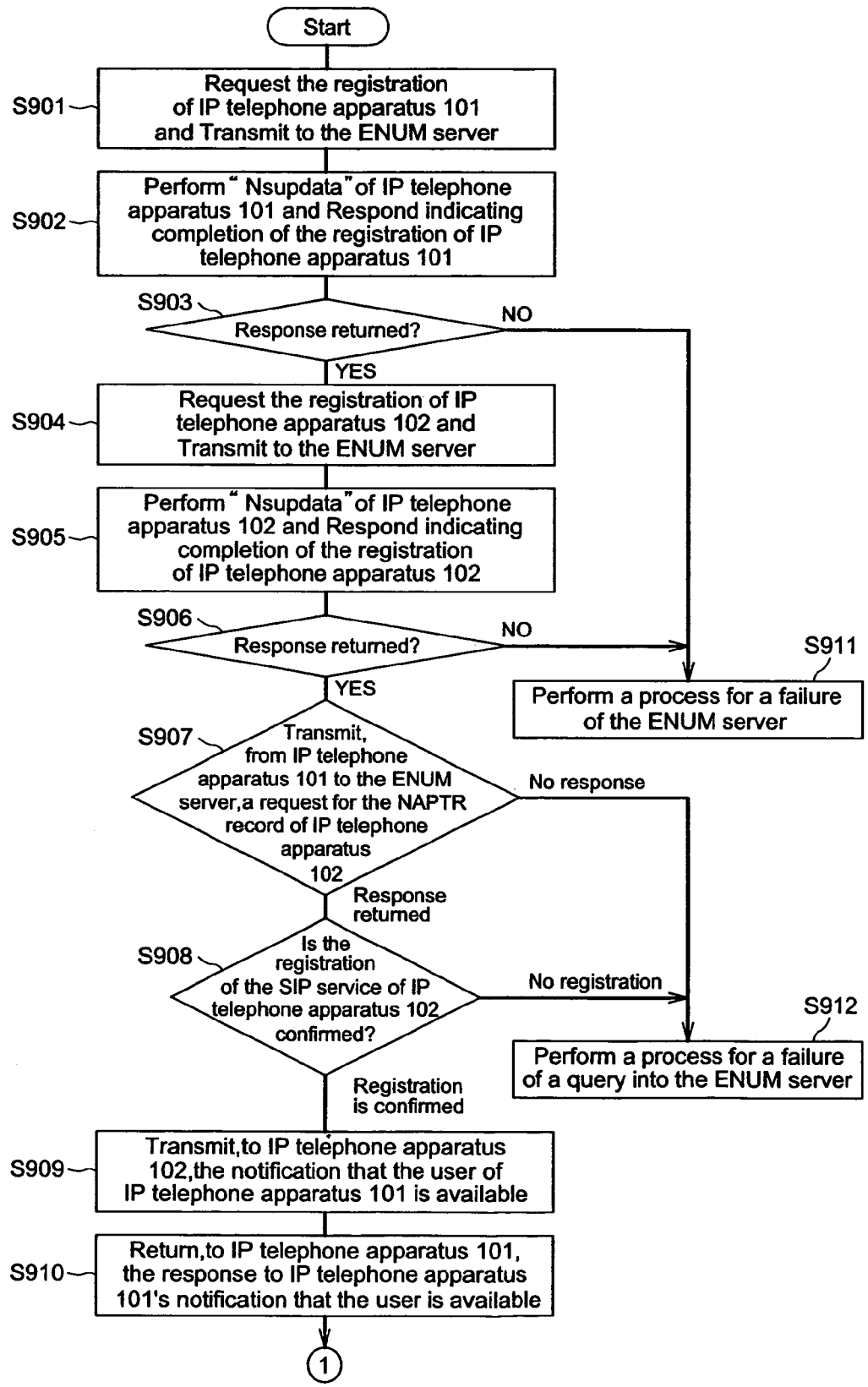
FIG. 9 illustrates a flow chart describing the operation of the IP telephone system according to the sequence diagram shown in FIG. 8.
Figure 10:
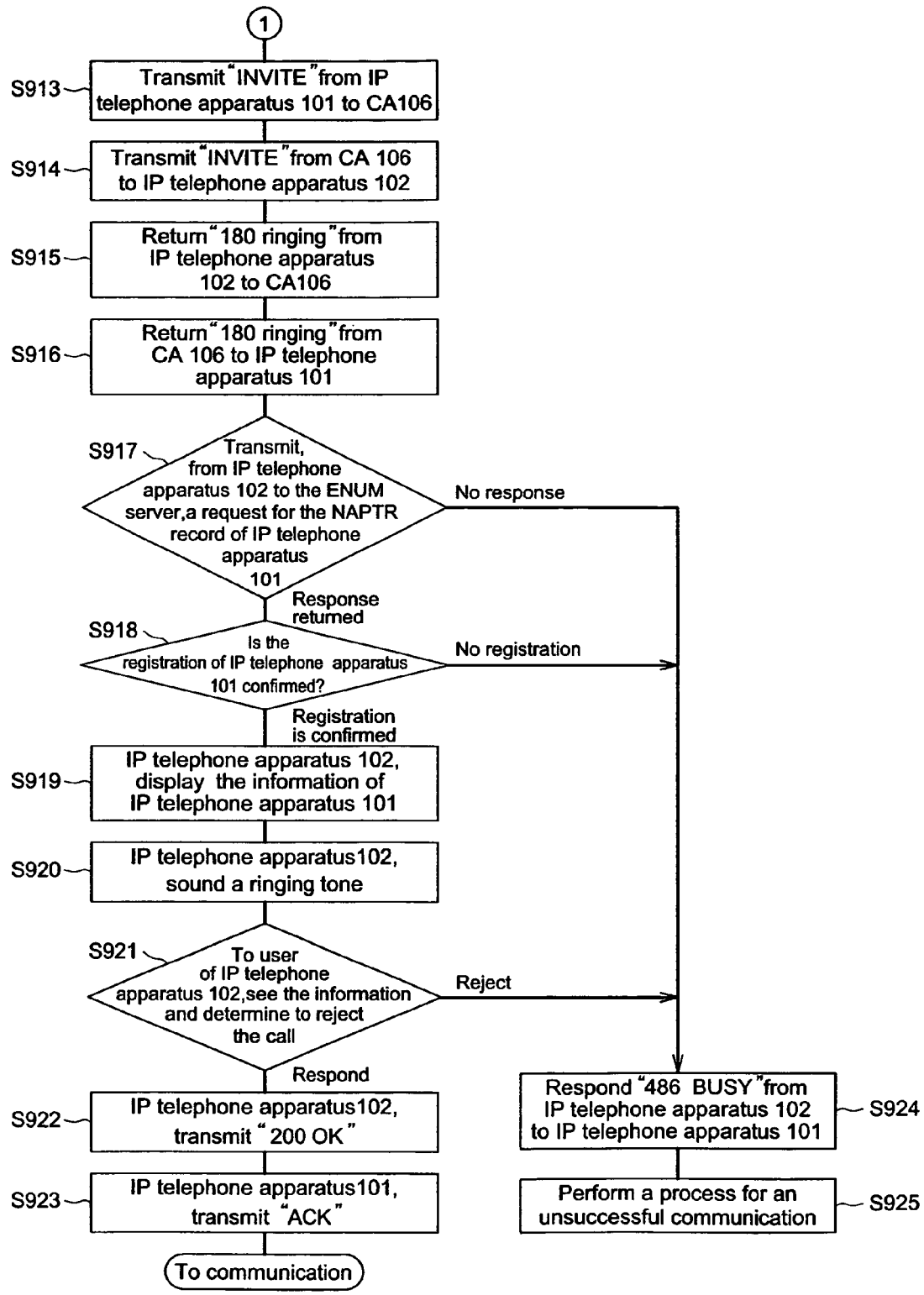
FIG. 10 illustrates a flow chart describing the operation sequent to the operation according to FIG. 9.

Next, the following describes the operation of IP telephone apparatus 101, IP telephone apparatus 102, ENUM server 103 and DNS server 104 according to the sequence diagram shown in FIG. 8 with reference to the flowcharts shown in FIG. 9 and FIG. 10.

IP telephone apparatus 101 and IP telephone apparatus 102 operate the same registration to ENUM server 103 according to step S901 through step S906 shown in FIG. 9 as the registration according to step S601 through step S606 shown FIG. 6. The description of this operation is thus omitted. The same NAPTR record request at step S907 and at step S908 shown in FIG. 9 is transmitted to the DNS server at step S607 and step S608 shown in FIG. 6. The description of the operation of the request for the NAPTR record is thus omitted. Likewise, the request for the IP address to the DNS server is not illustrated and the description is omitted. Between step S908 and step S909 the same IP address request is transmitted to the DNS server as that at step S609 shown in FIG. 6. The IP address of IP telephone apparatus 102 is obtained, followed by transmitting, to IP telephone apparatus 102, the message that the user of IP telephone apparatus 101 is available using the obtained IP address. Also, the same notification is transmitted to indicate that the user is available at step S909 and at step S910 shown in FIG. 9 as the notification transmitted at step S612 and at step S613 shown in FIG. 7. The description of this operation is thus omitted.

IP telephone apparatus 101 reads, from memory 202, the IP address corresponding to telephone number "310000001" when the user dials the number of IP telephone apparatus 102 "310000001". Then, IP telephone apparatus 101 transmits, from network I/F 205 to CA 106, the message "INVITE" including the telephone number of IP telephone apparatus 101 and the telephone number of IP telephone apparatus 102 (FIG. 10, step S913). Upon receiving the call including the message "INVITE" from IP telephone apparatus 101, CA 106 extracts the telephone number of IP telephone apparatus 102, which is a call destination, from the "To" header included in the message "INVITE".

Then, CA 106 transmits, to IP telephone apparatus 102, which is a call destination, the message "INVITE" including the telephone number of IP telephone apparatus 101 and the telephone number of IP telephone apparatus 102 received from IP telephone apparatus 101 (step S914). Upon receiving the message "INVITE" from CA 106, IP telephone apparatus 102 sounds a ringing tone to notify the user that a call is being received and returns, to CA 106, the message "180 ringing" (step S915). CA 106 returns, to IP telephone apparatus 101, a source IP telephone apparatus, the message "180 ringing" received from IP telephone apparatus 102 (step S916).

At the same time, when IP telephone apparatus 101 receives the message "180 ringing" from CA 106, the speaker of handset 203 produces the ring-back tone in order to notify the user of IP telephone apparatus 102, which is a call destination, that the call is being received.

Next, IP telephone apparatus 102 transmits, to ENUM server 103, the message "Request the NAPTR record of IP telephone apparatus 101". This message is a request for the NAPTR record of IP telephone apparatus 101, which is a source IP telephone apparatus. Then, IP telephone apparatus 102 confirms whether or not IP telephone apparatus 102 receives a response from ENUM server 103 (step S917). Upon receiving the message "Request the NAPTR record of IP telephone apparatus 101" from IP telephone apparatus 102 (step S917: response returned), ENUM server 103 extracts the NAPTR record of IP telephone apparatus 101 stored in database 403. Then, ENUM server 103 returns, to IP telephone apparatus 102, the message "Respond to the NAPTR record of IP telephone apparatus 101" in which the NAPTR record of IP telephone apparatus 101 is included.

IP telephone apparatus 102 receives, from ENUM server 103, the message "Respond to the NAPTR record of IP telephone apparatus 101" (step S917: response returned). Then, IP telephone apparatus 102 confirms the registration of the NAPTR record of IP telephone apparatus 101 by confirming whether or not a NAPTR record is included in the message "Respond to the NAPTR record of IP telephone apparatus 101" (step S918). When the NAPTR record is confirmed (step S918: registration is confirmed), IP telephone apparatus 102 displays, on display 204, the source number and the user information of IP telephone apparatus 101 (step S919). Then, IP telephone apparatus 102 sounds a ringing tone to notify the user that a call is being received (step S920).

Next, the user of IP telephone apparatus 102 confirms the user of the source IP telephone apparatus based on the information displayed on display 204 and determines whether to respond or to reject the received call (step S921). The user of IP telephone apparatus 102 takes handset 203 off the hook in order to respond to the received call (step S921: respond). Upon confirming that handset 203 is taken off the hook, CPU 201 in IP telephone apparatus 102 transmits, to IP telephone apparatus 101, the message "200OK" indicating that a connection has been approved (step S622). Upon receiving the message "200OK" from IP telephone apparatus 102, IP telephone apparatus 101 returns the message "ACK" to IP telephone apparatus 102 (step S923). When IP telephone apparatus 102 receives the message "ACK" from IP telephone apparatus 101, voice communication becomes available between IP telephone apparatus 101 and IP telephone apparatus 102.

Also, when the message "Request the NAPTR record of IP telephone apparatus 101" is not returned from ENUM server 103 (step S917: no response), when no registration is confirmed for the NAPTR record of IP telephone apparatus 101 (step S618: no registration) or when there is no off-hook operation by the user and the received call is rejected (step S921: rejected), IP telephone apparatus 102 transmits, to IP telephone apparatus 101, the message "486BUSY" (step S924) and performs a process indicating the communication was unsuccessful (step S925).

As described above, in IP telephone system 100 according to the embodiment of the present invention, IP telephone apparatus 101 and IP telephone apparatus 102 have a function of automatically storing the NAPTR record in ENUM server 103. As a result, IP telephone apparatus 101 and IP telephone apparatus 102 save the user the trouble of storing the NAPTR record in ENUM server 103.

Additionally, in IP telephone system 100 according to the embodiment of the present invention, IP telephone apparatus 101 and IP telephone apparatus 102 perform the processes necessary to establish voice communication via CA 106. Thus, the process of voice communication via CA 106 after the NAPTR record is registered into ENUM server 103 is performed in a simple and convenient manner.

The above-described embodiment described the notification provided to IP telephone apparatus 102 from IP telephone apparatus 101 indicating that the user is available. This notification can be provided to IP telephone apparatus 101 from IP telephone apparatus 102 prior to the voice communication in the same procedure. In the above-described embodiments, by pressing the predetermined key that indicates that the user is available, the NAPTR record of the IP telephone apparatus is stored in the ENUM server, after which the notification that the user is available is provided to the specified call destination. However, the user can also only perform one of storing the NAPTR record and notifying that the user is available to the specified call destination.

As a result, by adopting the present invention to the IP telephone system, the user-friendly IP telephone system is provided for the users of IP telephone apparatuses.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-247129 filed on Aug. 26, 2004 and No. 2005-84357 filed on Mar. 23, 2005 entire content of which is expressly incorporated by reference herein.

What is claimed is:

1. An Internet Protocol (IP) telephone apparatus connected to a Telephone Number Mapping (ENUM) server and a Domain Name System (DNS) server via a network, the ENUM server storing a Naming Authority Pointer (NAPTR) resource record of the IP telephone apparatus, the NAPTR resource record including a domain name corresponding to a Uniform Resource Identifier (URI), the domain name and the URI being associated with the IP telephone apparatus, the DNS server storing an IP address corresponding to the URI, the IP telephone apparatus comprising:

a memory that stores the NAPTR resource record of the IP telephone apparatus, and that stores a plurality of telephone numbers, wherein each telephone number is associated with a different predetermined call destination to transmit a notice indicating that a user of the IP telephone apparatus is available;

a panel that includes:

a first predetermined key, when actuated by the user of the IP telephone apparatus, that causes the IP telephone apparatus to initiate an automatic notification of each of the different predetermined call destinations that the user is available to answer the IP telephone apparatus;
a second predetermined key, when actuated by the user of the IP telephone apparatus, that causes the IP telephone apparatus to initiate an automatic notification of each of the different predetermined call destinations that the user is not available to answer the IP telephone apparatus, and
a controller that:
  transmits, to the ENUM server, a request for registering, in the ENUM server, the NAPTR resource record stored in the memory of the IP telephone apparatus when the predetermined key of the panel is selected, whereby the ENUM server stores the NAPTR resource record of the IP telephone apparatus in response to the request,
  obtains, from the ENUM server, a NAPTR resource record of each predetermined call destination, based on the plurality of telephone numbers stored in the memory of the IP telephone apparatus when the first predetermined key of the panel is selected,
  obtains, from the DNS server, an IP address of each predetermined call destination, based on the URI included in the NAPTR resource record of each predetermined call destination obtained from the ENUM server, and
  transmits, to each predetermined call destination, a notice indicating that the user of the IP telephone apparatus is available, based on the IP address of each predetermined call destination obtained from the DNS server.

2. An Internet Protocol (IP) telephone system, comprising:
a Telephone Number Mapping (ENUM) server that stores at least one Naming Authority Pointer (NAPTR) resource record, the NAPTR resource record including a domain name corresponding to a Uniform Resource Identifier (URI);
a Domain Name System (DNS) server that stores an IP address corresponding to the URI; and
an IP telephone apparatus, comprising:
  a memory that stores the NAPTR resource record of the IP telephone apparatus and that stores a plurality of telephone numbers, wherein each telephone number is associated with a different predetermined call destination, and the plurality of telephone numbers are used to transmit a notice indicating that a user of the IP telephone apparatus is available;
  a panel that includes:
    a first predetermined key, when actuated by a user of the IP telephone apparatus, that causes the IP telephone apparatus to initiate an automatic notification of each of the different predetermined call destinations that the user is available to answer the IP telephone apparatus;
    a second predetermined key, when actuated by the user of the IP telephone apparatus, that causes the IP telephone apparatus to initiate an automatic notification of each of the different predetermined call destinations that the user is not available to answer the IP telephone apparatus, and
  a controller that:
    transmits, to the ENUM server, a request for registering, in the ENUM server, the NAPTR resource record stored in the memory of the IP telephone apparatus when the predetermined key of the panel is selected, whereby the ENUM server stores the NAPTR resource record of the IP telephone apparatus in response to the request,
    obtains, from the ENUM server, a NAPTR resource record of each predetermined call destination, based on the plurality of telephone numbers stored in the memory of the IP telephone apparatus when the first predetermined key of the panel is selected,
    obtains, from the DNS server, an IP address of each predetermined call destination, based on the URI included in the NAPTR resource record of the predetermined call destination obtained from the ENUM server, and
    transmits, to each predetermined call destination, a notice indicating that the user of the IP telephone apparatus in available, based on the IP address of each predetermined call destination obtained from the DNS server.

3. A method for registering a Naming Authority Pointer (NAPTR) resource record of an Internet Protocol (IP) telephone apparatus in a Telephone Number Mapping (ENUM) server, the NAPTR resource record including a domain name corresponding to a Uniform Resource Identifier (URI), the domain name and the URI being associated with the IP telephone apparatus, the IP telephone apparatus being connected to the ENUM server and a Domain Name System (DNS) server via a network, the DNS server storing an IP address corresponding to the URI, the method comprising:
  storing, at the IP telephone apparatus, the NAPTR resource record of the IP telephone apparatus;
  storing, at the IP telephone apparatus, a plurality of telephone numbers, wherein each telephone number is associated with a different predetermined call destination, and the plurality of telephone numbers are used to transmit a notice indicating that a user of the IP telephone is available;
  actuating a first predetermined key at the IP telephone apparatus, by the user of the IP telephone apparatus, when the user is available to answer the IP telephone apparatus;
  transmitting, to the ENUM server, a request for registering in the ENUM server, the NAPTR resource record stored in the IP telephone apparatus when the first predetermined key is selected, whereby the ENUM server registers the NAPTR resource record of the IP telephone apparatus in response to the request;
  obtaining, from the ENUM server, a NAPTR resource record of each predetermined call destination, based on the plurality of telephone numbers stored in the IP telephone apparatus when the first predetermined key of the panel is selected;
  obtaining, from the DNS server, an IP address of each predetermined call destination, based on the URI included in the NAPTR resource record of each predetermined call destination obtained from the ENUM server;
  transmitting, to each predetermined call destination, a notice indicating that the user of the IP telephone apparatus is available, based on the IP address of each predetermined call destination obtained from the DNS server; and
  actuating a second predetermined key at the IP telephone apparatus, by the user of the IP telephone apparatus, thereby initiating an automatic notification of each of the predetermined call destinations that the user is not available to answer the IP telephone apparatus.

4. The Internet Protocol telephone apparatus according to claim 1, wherein the actuation of the second predetermined key of the IP telephone apparatus also simultaneously initiates an answering telephone function, for when the user of the IP telephone apparatus is not available.

5. The Internet Protocol telephone system according to claim 2, wherein the actuation of the second predetermined key of the IP telephone apparatus also simultaneously initiates an answering telephone function, for when the user of the IP telephone apparatus is not available.

6. The method according to claim 3, wherein the actuation of the second predetermined key of the IP telephone apparatus also simultaneously initiates an answering telephone function, for when the user of the IP telephone apparatus is not available.

7. The Internet Protocol telephone apparatus according to claim 1, further including a plurality of indicators, wherein each of the plurality of indicators is associated with one of the predetermined call destinations and indicates to the user of the IP telephone apparatus the availability of each of predetermined users of the predetermined call destinations.

8. The Internet Protocol telephone system according to claim 2, further including a plurality of indicators, wherein each of the plurality of indicators is associated with one of the predetermined call destinations and indicates to the user of the IP telephone apparatus the availability of each of predetermined users of the predetermined call destinations.

9. The method according to claim 3, further including indicating to the user of the IP telephone the availability of predetermined users of each of the predetermined call destinations by using a plurality of indicators on the IP telephone apparatus, wherein each of the plurality of indicators is associated with one of the predetermined call destinations.

* * * * *